United States Patent
Baur et al.

[11] 3,745,576
[45] July 10, 1973

[54] IMPULSE RADAR SYSTEM UTILIZING PULSE DURATION MODULATION

[75] Inventors: Friedrich Baur, Muenich-Maxhof; Jürgen Naujoks, Munich, both of Germany

[73] Assignee: Siemens Aktiengesellschaft, Berlin and Munich, Germany

[22] Filed: June 1, 1961

[21] Appl. No.: 114,266

[52] U.S. Cl. .......................... 343/13 R, 343/17.2 R
[51] Int. Cl. ............................................. G01s 9/06
[58] Field of Search........................ 343/14, 17.2, 13

[56] References Cited
UNITED STATES PATENTS
2,556,109  6/1951  Rust et al.............................. 343/14
2,753,448  7/1956  Rines................................ 343/17.2

*Primary Examiner*—Malcolm F. Hubler
*Attorney*—Hill, Sherman, Meroni, Gross & Simpson

EXEMPLARY CLAIM

1. An impulse radar system operating with high pulse repetition frequency and doppler frequency evaluation and employing a plurality of distance measuring branches which are, for the measurement of the pulse frequency, by means of gate switches successively scanned by sampling pulses, comprising means at the receiver side for pulse duration modulating the pulses transmitted, at the receiver side for demodulating pulse duration modulation applied periodically at the transmitting side so as to produce rough distance measuring pulses, a coincidence circuit, and means for conducting said rough distance measuring impulses together with other pulses to said coincidence circuit, operative to form fine pulses upon coincidence of the pulses conducted thereto, which permit unequivocal distance indication even in the presence of high pulse repetition frequency.

5 Claims, 1 Drawing Figure

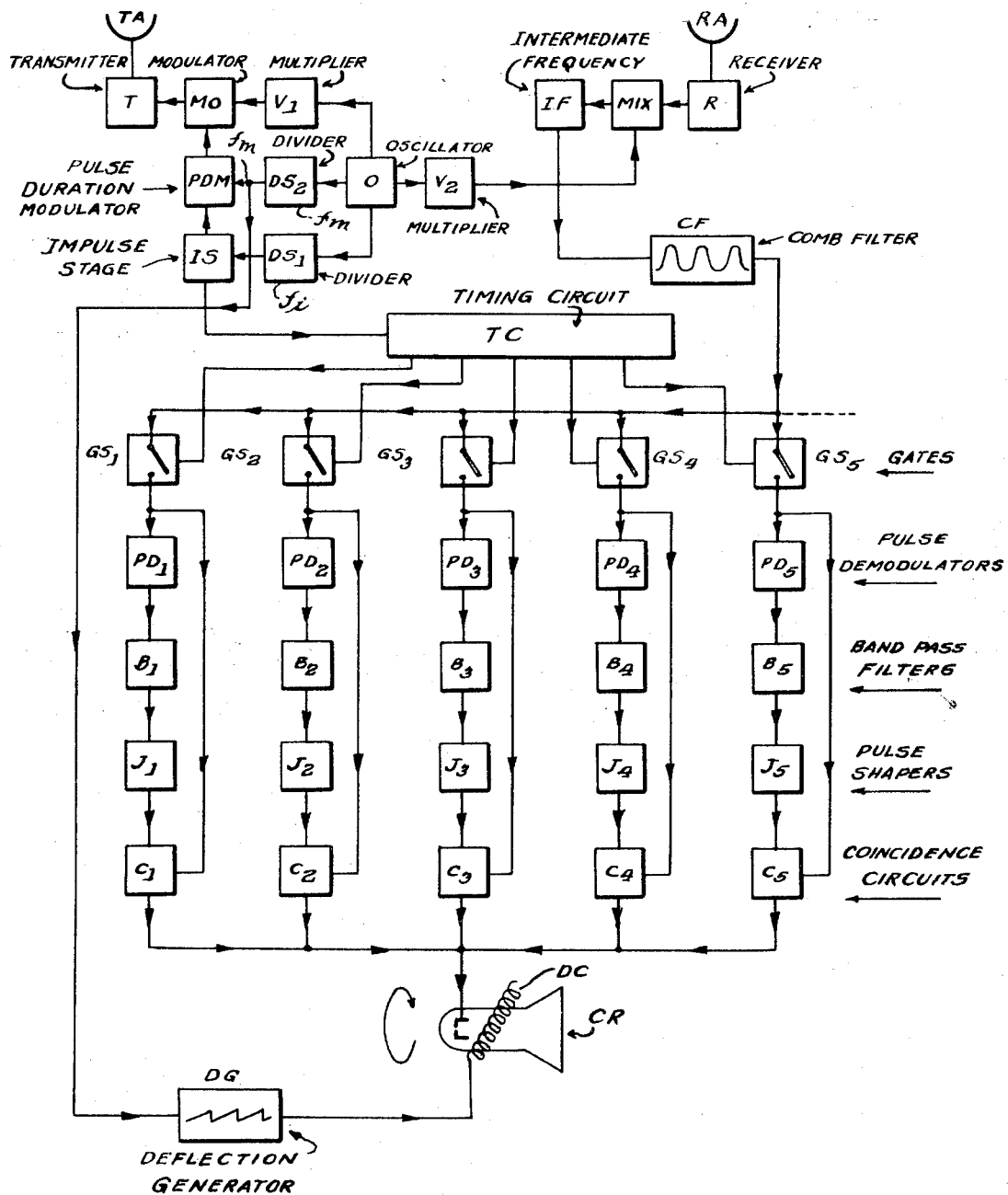

IMPULSE RADAR SYSTEM UTILIZING PULSE DURATION MODULATION

This invention is concerned with an pulse radar system operating with high pulse repetition frequency and doppler frequency evaluation.

The doppler frequency shift occurring in connection with moving objects is utilized in the pulse doppler frequency radar system for the purpose of distinguishing between fixed and moving targets. Since the pulse character and therewith the distance information are lost in the case of simple filters, it has been proposed to use for the pulse timing measurement separate distance measuring branches which are by means of gate switches successively scanned with sampling pulses. Identical doppler frequency filters can in such case be inserted in the individual distance measuring branches.

Difficulties arise in the doppler frequency system owing to the socalled interfering frequencies which occur when the doppler frequency is equal to or a multiple of the impulse repetition frequency of the radar apparatus. In order to avoid detrimental effects on the measurement, the data of the apparatus must be selected so that the first interfering frequency lies at the upper limit of the measuring range, if possible above the maximum radial speed of the object concerned with the measurement. The interfering frequency can be increased by increase of the carrier wave length or by increase of the pulse repetition frequency.

Increase of the wave length results in antennae structures with excessively large dimensions and in other drawbacks connected therewith, and it is, therefore, more advantageous to effect an increase of the pulse repetition frequency while utilizing a fixed predetermined carrier wave length which is as short as possible.

However, the pulse repetition frequency cannot be readily increased in connection with apparatus of considerable transmitter output and relatively great range because echos from previous pulses would return after each transmitted pulse. Such echos result in false distance indication if the deflection frequency of the radar sighting tube is, as is customary, equal to the pulse repetition frequency. If the deflection of the indicating tube is derived by division from the pulse repetition frequency, there will result a multiple indication. However, such division must be frequently employed in order to extend the indicating range beyond the range that may be calculated from the pulse repetition frequency. Accordingly, an impulse repetition frequency which is in consideration of the first interfering frequency strongly increased, leads to a false or to an ambiguous indication and therewith to uncertain measuring results. The object of the present invention is to overcome this drawback.

The German Pat. No. 911,663 describes an pulse doppler frequency radar system employing a periodic frequency variation at an impulse modulated transmitter with evaluation of the frequency shift of the received frequency with respect to the transmitted frequency. The distance is thereby determined by consideration of the pulse running time as well as the frequency shift. This is effected by utilizing the pulse running time for rough measurement while employing the frequency shift for the fine measurement. This procedure is not adapted for work with increased pulse repetition frequency and to avoid the drawbacks of an indication affected by the interfering frequencies. The known procedure is moreover not adapted to suppress signals from fixed targets while indicating moving targets if both are at the same distance.

Copending U.S. application Ser. No. 88,580, filed Feb. 10, 1961, owned by the assignee also noted in the present case, proposes to avoid the difficulties arising in connection with an pulse doppler frequency radar system due to interfering frequencies, by an increase of the pulse repetition frequency. It is proposed to employ an auxiliary periodic frequency modulation at the transmitter so as to obtain from the frequency shift of the received frequency, with respect to the transmitted frequency, rough distance pulses which produce unequivocal indication of the fine distance measurement.

Another copending U.S. application Ser. No. 88,581, filed Feb. 10, 1961, likewise owned by the assignee named in the present case, proposes to employ for the same purpose an auxiliary amplitude modulation of the pulse modulated transmitter carrier wave.

It will be seen, therefore, that the principle involved in both proposals according to the two above noted prior applications, resides in selecting the distance pulses which are very accurate but lead to a false or equivocal indication, by a second distance information which need not be accurate but which must be unequivocal. As a consequence, there are obtained highly accurate distance measuring pulses which invariably result in correct and unequivocal measurements. The advantage resides in the possibility of considerably increasing the pulse repetition frequency without detrimentally affecting the measurement accuracy and obtaining measurement free of ambiguity. The high pulse repetition frequency permits placing of the interfering frequency very high and to produce occurrence of further interfering frequencies outside of the range of the speed of aircraft which is of interest.

The proposals according to the copending applications, concerning the use of auxiliary frequency modulation and amplitude modulation, respectively, so as to obtain unequivocal indication, do not constitute the only possibilities for the solution of the problems involved, nor do they constitute in some circumstances the best possible solutions so far as the expenditure and the interference spacing are concerned.

The present invention proposes a further solution which presents advantages, such solution contemplating the use of periodic, preferably sine shaped pulse duration modulation of the transmitted pulses so as to obtain at the receiver, by demodulation of the pulse duration modulation, rough distance measurement pulses which are in a coincidence circuit combined with the previously noted equivocal fine measuring pulses, thereby forming upon coincidence of rough measurement pulses with fine measurement pulses accurate measuring pulses which permit unequivocal distance indication even in the presence of high pulse repetition frequency.

The various objects and features of the invention will appear from the description which is rendered below with reference to the accompanying drawing showing an example of a circuit of a radar system adapted for realizing the invention.

The system comprises a transmitter T and a receiver R which advantageously operate, for good decoupling, respectively with separate rotating antennas TA and RA. Character O indicates a quartz stabilized oscillator from which is obtained, by frequency multiplication in a multiplier stage V1, a high carrier frequency in the centimeter- or millimeter wave range, which is conducted to the transmitter stage T over a modulator Mo. Reference DS1 indicates a divider stage for obtaining from the oscillator O, in the impulse stage IS, the pulse sequence frequency $fi$ which is used for modulation in the transmitter T. However, before the pulses from the impulse stage IS reach the modulator Mo, they pass through a pulse duration modulator PDM in which they are as to duration thereof modulated with a frequency $fm$. The modulation frequency $fm$ for the pulse duration modulation is likewise derived from the oscillator O over a further divider stage DS2, but is in consideration of the maximum measured frequency spacing lower than the pulse repetition frequency. The receiver stage R is connected with a mixing stage Mix, in which is effected heterodyning with a frequency which differs by the amount of the receiver intermediate frequency from the transmitter carrier frequency. This frequency can be derived from the oscillator O over a further multiplier stage V2.

Moving and stationary targets can be differentiated in known manner by the use of doppler frequency filters. As is likewise known, comb filters are suitable for this purpose as are, in given cases, simple filters. The demodulated received frequency is in the illustrated circuit conducted from the intermediate frequency stage IF to a comb filter CF, which filters out the frequencies not containing doppler frequencies without detrimentally affecting the signal. The comb filter is provided to prevent simulation of moving targets by the noise products appearing subsequently upon possible subdivision of the fixed target echos in the gate circuits.

The comb filter CF is connected with a plurality of distance measuring circuits, five in the present case, which are successively briefly switched in by means of gate switches GS1 . . . GS5, that is, they are scanned with socalled sampling pulses. An electronic timing circuit TC is, for example, employed for controlling the gate circuits, such timing circuit being controlled from the impulse stage IS, with the pulse repetition frequency of the apparatus, placing continuously successively accurate sampling pulses on the gate circuits GS1 . . . GS5, so that any succeeding gate is closed when the preceding gate is being opened. As soon as an pulse is received within the accurately defined interval in which one of the gate switches is closed, it will enter the corresponding distance measurement branch. The signals arriving from moving targets are thereupon conducted to the pulse demodulators PD1 . . . PD5 so as to obtain again the pulse duration modulation frequency fm prevailing at the transmitter side. The modulation frequency thereafter passes through a band pass filter B1 . . . B5 which is tuned thereto. The phase position of the modulation frequency obtained at this point depends upon the distance of the target. It is accordingly possible to produce upon zero passage a distance pulse which indicates by its position as to time the target distance more or less roughly. This impulse production is effected in a pulse shaper circuit such as J1 . . . J5. A circuit may be employed for this purpose which releases a sawtooth voltage or the like, upon zero passage or upon passage through a predetermined voltage value. Such a circuit is for example known under the name of multiar circuit.

The relatively rough but unequivocal distance measurement pulse obtained from the pulse duration modulation, is conducted to one input of a coincidence circuit such as C1 . . . C5, to the other input of which are conducted the fine measurement pulses proper from the timing measurement of the reflected pulses. In the present case, the echo pulses which appear at the outputs of the respective gates GS1 . . . GS5, and which are in view of the high pulse repetition frequency, in effect, intermixed, are conducted to the respective coincidence circuits as fine pulses. The coincidence circuit involved delivers an output signal only upon coincidence of a rough distance measuring pulse with an accurate fine measuring pulse, thereby extracting the latter.

There will accordingly appear at the outputs of the coincidence circuits exact and accurate distance measuring pulses which are conducted to the cathode ray tube CR disposed in the radar sighting device for the bright scanning of the beam. The electron beam of the sighting tube is radially deflected by the action of a deflection coil DC controlled by a deflection generator DG, such deflection coil rotating synchronously with the radar antenna while the deflection device operates synchronously with the modulation frequency $fm$. In order to effect the required synchronization, the deflection device DG is connected with a point of the transmitter circuit at which the modulation frequency appears, for example, at the output of the divider stage DS2 or the input of the pulse duration modulator PDM.

When selecting a very short wave length, in the centimeter- or microwave range, the system according to the invention will permit the use of pulse repetition frequencies of the radar apparatus in the order of magnitude of 25 kilocycles. There may be used a considerably lower pulse duration modulation frequency fm of a few 100 cycles. In this example, there will result a doppler frequency shift of 25 kilocycles at a speed of the target of about 1,350 kilometers per hour for a carrier wave length of about 3 centimeters. The first interfering frequency occurs in this example at a speed of 1,350 kilometers per hour.

Changes and modifications may be made within the scope and spirit of the appended claims which define what is believed to be new and desired to have protected by Letters Patent.

We claim:

1. An impulse radar system operating with high pulse repetition frequency and doppler frequency evaluation and employing a plurality of distance measuring branches which are, for the measurement of the pulse frequency, by means of gate switches successively scanned by sampling pulses, comprising means at the receiver side for pulse duration modulating the pulses transmitted, means at the receiver side for demodulating pulse duration modulation applied periodically at the transmitting side so as to produce rough distance measuring pulses, a coincidence circuit, and means for conducting said rough distance measuring impulses together with other pulses to said coincidence circuit, operative to form fine pulses upon coincidence of the pulses conducted thereto, which permit unequivocal distance indication even in the presence of high pulse repetition frequency.

2. A system according to claim 1, wherein said other pulses are echo pulses.

3. A system according to claim 1, wherein said other pulses are sampling pulses.

4. A system according to claim 1, wherein said other pulses are timing pulses which control the release of sampling pulses.

5. A system according to claim 1, wherein in said modulating means is constructed to produce sine wave pulse duration modulation of the transmitted pulse, and said demodulating means is constructed to demodulate pulses so modulated.

* * * * *